(12) United States Patent
Bankoski et al.

(10) Patent No.: US 9,106,933 B1
(45) Date of Patent: Aug. 11, 2015

(54) APPARATUS AND METHOD FOR ENCODING VIDEO USING DIFFERENT SECOND-STAGE TRANSFORM

(75) Inventors: James Bankoski, Wynantskill, NY (US); Paul Wilkins, Cambridge (GB); Yaowu Xu, San Diego, CA (US)

(73) Assignee: GOOGLE INC., Mountain View, CA (US)

( * ) Notice: Subject to any disclaimer, the term of this patent is extended or adjusted under 35 U.S.C. 154(b) by 533 days.

(21) Appl. No.: 13/110,278

(22) Filed: May 18, 2011

Related U.S. Application Data

(60) Provisional application No. 61/345,976, filed on May 18, 2010.

(51) Int. Cl.
*H04N 7/26* (2006.01)
*H04N 19/94* (2014.01)
*H04N 19/124* (2014.01)

(52) U.S. Cl.
CPC ............ *H04N 19/94* (2014.11); *H04N 19/124* (2014.11)

(58) Field of Classification Search
None
See application file for complete search history.

(56) References Cited

U.S. PATENT DOCUMENTS

| | | | |
|---|---|---|---|
| 4,774,574 A | 9/1988 | Daly et al. | |
| 5,068,724 A | 11/1991 | Krause et al. | |
| 5,091,782 A | 2/1992 | Krause et al. | |
| 5,121,216 A | 6/1992 | Chen et al. | |
| 5,146,324 A | 9/1992 | Miller et al. | |
| 5,224,062 A | 6/1993 | McMillan, Jr. et al. | |
| 5,235,623 A | 8/1993 | Sugiyama et al. | |
| 5,260,782 A | 11/1993 | Hui | |
| 5,274,442 A | 12/1993 | Murakami et al. | |
| 5,341,440 A | 8/1994 | Earl et al. | |
| 5,422,963 A | 6/1995 | Chen et al. | |
| 5,444,800 A | 8/1995 | Kim | |
| 5,635,938 A | 6/1997 | Komoto | |

(Continued)

FOREIGN PATENT DOCUMENTS

| | | |
|---|---|---|
| WO | WO2010039015 | 4/2010 |
| WO | WO2010039288 | 4/2010 |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May, 2003.

(Continued)

*Primary Examiner* — Sath V Perungavoor
*Assistant Examiner* — Kehinde O Abimbola
(74) *Attorney, Agent, or Firm* — Young Basile Hanlon & MacFarlane P.C.

(57) ABSTRACT

A system, apparatus, and method of encoding a video stream having a plurality of frames, each frame having a plurality of blocks is disclosed. The method includes selecting a group of blocks from a current frame of the plurality of frames, determining a plurality of first stage transform coefficient matrices for the group of blocks using a first transform technique, determining a DC second stage transform coefficient matrix for the group of blocks based on at least some of the plurality of first stage transform coefficient matrices and using a second transform technique on a processor, and encoding the group of blocks into an encoding format using the DC second stage coefficient matrix and the first stage coefficient matrices.

18 Claims, 5 Drawing Sheets

(56) References Cited

U.S. PATENT DOCUMENTS

| | | | |
|---|---|---|---|
| 5,650,782 A | 7/1997 | Kim | |
| 5,737,020 A | 4/1998 | Hall et al. | |
| 5,872,866 A | 2/1999 | Strongin et al. | |
| 5,903,669 A | 5/1999 | Hirabayashi | |
| 6,108,383 A | 8/2000 | Miller et al. | |
| 6,115,501 A | 9/2000 | Chun et al. | |
| 6,134,350 A * | 10/2000 | Beck | 382/240 |
| 6,167,161 A | 12/2000 | Oami | |
| 6,285,801 B1 | 9/2001 | Mancuso et al. | |
| 6,408,025 B1 | 6/2002 | Kaup | |
| 6,522,783 B1 | 2/2003 | Zeng et al. | |
| 6,522,784 B1 | 2/2003 | Zlotnick | |
| 6,621,867 B1 | 9/2003 | Sazzad et al. | |
| 6,807,317 B2 | 10/2004 | Mathew et al. | |
| 6,819,793 B1 | 11/2004 | Reshetov et al. | |
| 6,917,651 B1 | 7/2005 | Yoo et al. | |
| 6,934,419 B2 | 8/2005 | Zlotnick | |
| 7,054,367 B2 | 5/2006 | Oguz et al. | |
| 7,088,351 B2 | 8/2006 | Wang | |
| 7,266,149 B2 | 9/2007 | Holcomb et al. | |
| 7,277,592 B1 | 10/2007 | Lin | |
| 7,292,634 B2 * | 11/2007 | Yamamoto et al. | 375/240.16 |
| 7,447,337 B2 | 11/2008 | Zhang et al. | |
| 7,492,823 B2 | 2/2009 | Lee et al. | |
| 7,657,098 B2 | 2/2010 | Lin et al. | |
| 7,894,530 B2 | 2/2011 | Gordon et al. | |
| 7,912,318 B2 | 3/2011 | Nakayama | |
| 7,936,820 B2 | 5/2011 | Watanabe et al. | |
| 8,000,546 B2 | 8/2011 | Yang et al. | |
| 8,094,950 B2 * | 1/2012 | Sasagawa | 382/232 |
| 8,111,914 B2 | 2/2012 | Lee et al. | |
| 8,200,028 B2 | 6/2012 | Gabso et al. | |
| 8,218,629 B2 | 7/2012 | Lee et al. | |
| 8,295,367 B2 | 10/2012 | Tang et al. | |
| 8,582,656 B2 * | 11/2013 | Lin et al. | 375/240.18 |
| 2002/0168114 A1 | 11/2002 | Valente | |
| 2002/0196983 A1 * | 12/2002 | Kobayashi | 382/251 |
| 2003/0048943 A1 | 3/2003 | Ishikawa | |
| 2003/0053708 A1 | 3/2003 | Kryukov et al. | |
| 2003/0053711 A1 | 3/2003 | Kim | |
| 2003/0146925 A1 | 8/2003 | Zhao et al. | |
| 2004/0057519 A1 * | 3/2004 | Yamamoto et al. | 375/240.16 |
| 2004/0125204 A1 | 7/2004 | Yamada et al. | |
| 2004/0179820 A1 | 9/2004 | Kashiwagi et al. | |
| 2005/0147163 A1 | 7/2005 | Li et al. | |
| 2005/0249291 A1 | 11/2005 | Gordon et al. | |
| 2006/0013315 A1 | 1/2006 | Song | |
| 2006/0045368 A1 | 3/2006 | Mehrotra | |
| 2006/0098738 A1 | 5/2006 | Cosman et al. | |
| 2006/0115168 A1 | 6/2006 | Kobayashi | |
| 2006/0133682 A1 | 6/2006 | Tu et al. | |
| 2006/0210181 A1 | 9/2006 | Wu et al. | |
| 2006/0239575 A1 * | 10/2006 | Abe et al. | 382/246 |
| 2006/0251330 A1 | 11/2006 | Toth et al. | |
| 2007/0036223 A1 | 2/2007 | Srinivasan | |
| 2007/0078661 A1 * | 4/2007 | Sriram et al. | 704/501 |
| 2007/0110152 A1 | 5/2007 | Lee et al. | |
| 2007/0140349 A1 * | 6/2007 | Burazerovic | 375/240.18 |
| 2007/0211953 A1 * | 9/2007 | Sasagawa | 382/250 |
| 2007/0223583 A1 | 9/2007 | Nagai et al. | |
| 2008/0008246 A1 * | 1/2008 | Mukherjee et al. | 375/240.18 |
| 2008/0043848 A1 * | 2/2008 | Kuhn | 375/240.16 |
| 2008/0123977 A1 | 5/2008 | Moriya et al. | |
| 2008/0253463 A1 * | 10/2008 | Lin et al. | 375/240.25 |
| 2008/0298472 A1 | 12/2008 | Jain et al. | |
| 2008/0310512 A1 | 12/2008 | Ye et al. | |
| 2009/0041128 A1 | 2/2009 | Howard | |
| 2009/0049641 A1 | 2/2009 | Pullins et al. | |
| 2009/0067503 A1 * | 3/2009 | Jeong et al. | 375/240.16 |
| 2009/0123066 A1 * | 5/2009 | Moriya et al. | 382/166 |
| 2009/0228290 A1 * | 9/2009 | Chen et al. | 704/500 |
| 2009/0274382 A1 | 11/2009 | Lin et al. | |
| 2010/0020867 A1 | 1/2010 | Wiegand et al. | |
| 2010/0034268 A1 | 2/2010 | Kusakabe et al. | |
| 2010/0046628 A1 | 2/2010 | Bhaskaran et al. | |
| 2010/0246951 A1 | 9/2010 | Chen et al. | |
| 2010/0290520 A1 | 11/2010 | Kamisli et al. | |
| 2010/0309286 A1 | 12/2010 | Chen et al. | |
| 2011/0032983 A1 | 2/2011 | Sezer | |
| 2011/0090959 A1 | 4/2011 | Wiegand et al. | |
| 2011/0182352 A1 | 7/2011 | Pace | |
| 2011/0206135 A1 | 8/2011 | Drugeon et al. | |
| 2011/0235706 A1 | 9/2011 | Demircin et al. | |
| 2011/0264676 A1 | 10/2011 | Belan et al. | |
| 2011/0286516 A1 | 11/2011 | Lim et al. | |
| 2012/0057360 A1 | 3/2012 | Swan | |
| 2012/0128066 A1 * | 5/2012 | Shibahara et al. | 375/240.03 |
| 2012/0177116 A1 | 7/2012 | Panusopone et al. | |
| 2012/0201298 A1 | 8/2012 | Panusopone et al. | |
| 2013/0003828 A1 | 1/2013 | Cohen et al. | |
| 2013/0272422 A1 | 10/2013 | Lee et al. | |
| 2014/0092956 A1 | 4/2014 | Panusopone et al. | |

FOREIGN PATENT DOCUMENTS

| | | |
|---|---|---|
| WO | WO2011049399 | 4/2011 |
| WO | WO2014075552 | 5/2014 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

Han et al., "Toward Jointly Optimal Spatial Prediction and Adaptive Transform in Video/Image Coding," ICASSP 2010 (Dallas, TX, Mar. 14-19, 2010).

Sikora, T. et al., Shape-adaptive DCT for generic coding of video, Circuits and Systems for Video Technology, IEEE Transactions on vol. 5, Issue 1, p. 59-62, Feb. 1, 1995.

B. Bross, H. Kirchoffer, H. Schwarz, T. Wiegand,"Fast intra encoding for fixed maximum depth of transform quadtree," JCTVC-C311_r1, Guangzhou, CN, Oct. 2010.

B. Bross, W.-J Han, J.-R. Ohm, G. J. Sullivan, T. Wiegand: "High efficiency video coding (HEVC) text specification draft 7", Document of Joint Collaborative Team on Video Coding, JCTVC-I1003-d4, Apr. 27-May 7, 2012.

(56) References Cited

OTHER PUBLICATIONS

Chen J et al. "Description of scalable video coding technology proposal by Qualcomm (configuration)", 11. JCT-VC Meeting; 102. MPEG Meeting; Oct. 10, 2012 Oct. 19, 2012; Shanghai; (Joint Collaborative Team on Video Coding of ISO/IEC JTC1/SC29/WG11 and ITU-T SG.16); URL:http://WFTP3.ITU.INT/AV-ARCH/JCTVC-SITE/, No. JCTVC-K0035, Oct. 2, 2012, all pages.

Chen J. et al., "TE:Simulation results for various max. number of transform quadtree depth," MPEG Meeting, Guangzhou, Chima; No. M18236; Oct. 28, 2010.

Chen P. et al., "Video coding using extended block sizes," VCEG Meeting, San Diego, US; No. VCEG-AJ23, Oct. 15, 2008.

Guo L et al.: "Transform Selection for Inter-Layer Texture Prediction in Scalable Video Coding", 11. JCT-VC Meeting; 102; MPEG Meeting; Oct. 10, 2012-Oct. 19, 2012; Shanghai; (Joint Collaborative Team on Video Coding of ISO/IEC JTC/WG11 and ITU-T SG.16); URL:http://WFTP3.ITU.INT/AV-ARCH/JVTVC-SITE/,, No. JCTVC-K0321, Oct. 7, 2012, all pages.

ISR and Written Opinion of the International Searching Authority, for Int'l Application No. PCT/US2012/021475; Mar. 29, 2012

ISR and Written Opinion of the International Searching Authority, for Int'l Application No. PCT/US2012/020167; Mar. 29, 2012.

ISR, & Written Opinion of the International Searching Authority for International Application No. ISR/US2013/062216 (cs39797), Dec. 12, 2013, 12 pages.

Lee B. et al., "Hierarchical variable block transform," JCT-VC Meeting, Geneva, Switzerland; No. JCTVC-B050; Jul. 24, 2010.

Lee T et al: "TE12.1: Experimental results of transform unit quadtree/2-level test", 3 JCT-VC Meeting; 94. MPEG Meeting; 94. MPEG Meeting; Oct. 7, 2010-Oct. 15, 2010; Guangzhou; (Joint Collaborative Team on Video Coding of ISO/IEC JTC1/SC29/WG11 and ITU-T SG.16); URL:http://WFTP3.ITU.INT/AV-ARCH/JCTVC-SITE/,, No. JCTVC-C200, Oct. 2, 2010, all pages.

McCann K. et al.; "Video coding technology proposal by samsung (and BBC)," JCT-VC Meeting; Dresden, Germany, Apr. 15, 2010.

Panusopone K. et al., "Flexible Picture Partitioning", JCT-VC (Joint Collaborative Team on Video Coding) Meeting, Oct. 7-Oct. 15, 2010.

Saxena A et al.: "On secondary transforms for Intra BVL residue", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL:http://WFTP3.ITU.INT/AV-ARCH/JCTVC-SITE/, No. JCTVC-M0033, Apr. 9, 2013, all pages.

Saxena A et al.: "On secondary transforms for infra/inter prediction residual", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL:http://WFTP3.ITU.INT/AV-ARCH/JCTVC-SITE/,, No. JCTVC-10232, Apr. 17, 2012, all pages.

T. Wiegand, B. Bross, J. Ohm, G. Sullivan, "WD1: Working Draft 1 of High-Efficiency Video Coding," JCTVC-C403, Guangzhou, CN, Oct. 7-15, 2010.

Wiegand et al. "BoG report: residual quadtree structure" JCTVC-C319_r1, Guangzhou, CN Oct. 2010.

* cited by examiner

APPARATUS AND METHOD FOR ENCODING VIDEO USING DIFFERENT SECOND-STAGE TRANSFORM

CROSS REFERENCE TO RELATED APPLICATIONS

This application claims priority to U.S. Provisional Patent Application Ser. No. 61/345,976, filed May 18, 2010, which is incorporated herein in its entirety.

TECHNICAL FIELD

The present disclosure relates in general to video encoding and decoding.

BACKGROUND

An increasing number of applications today make use of digital media for various purposes including, for example, remote business meetings via video conferencing, high definition video entertainment, video advertisements, and sharing of user-generated videos. As technology is evolving, users have higher expectations for media quality and, for example, expect high resolution video even when transmitted over communications channels having limited bandwidth.

To permit transmission of digital video streams while limiting bandwidth consumption, a number of video compression schemes have been devised, including formats such as VPx, promulgated by Google, Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

SUMMARY

Disclosed herein are exemplary approaches for encoding video using different second-stage transform.

In one exemplary approach, a method of encoding a video stream having a plurality of frames, each frame having a plurality of blocks is disclosed. The method includes selecting a group of blocks from a current frame of the plurality of frames, determining a plurality of first stage transform coefficient matrices for the group of blocks using a first transform technique, determining a DC second stage transform coefficient matrix for the group of blocks based on at least some of the plurality of first stage transform coefficient matrices and using a second transform technique on a processor, and encoding the group of blocks into an encoding format using the DC second stage coefficient matrix and the first stage coefficient matrices.

In another exemplary approach, a method of encoding a video stream having a plurality of frames, each frame having a plurality of blocks is disclosed. The method includes determining a plurality of first stage transform coefficient matrices for a group of blocks of a current frame of the plurality of frames using a DCT transform technique, the first stage transform coefficient matrices each having a DC coefficient, determining a second stage transform coefficient matrix from the DC coefficients within the first stage transform coefficient matrices of the group of blocks using a WHT transform technique on a processor, and encoding the group of blocks into an encoding format using at least one of the second stage coefficient matrix or the first stage coefficient matrices.

In another exemplary approach, a computing device for encoding a video stream having a plurality of frames, each frame having a plurality of blocks is disclosed. The computing device includes a memory and a processor configured to execute instructions stored in the memory to: select a group of blocks from a current frame of the plurality of frames, determine a plurality of first stage transform coefficient matrices for the group of blocks using a first transform technique, determine a DC second stage transform coefficient matrix for the group of blocks based on at least some of the plurality of first stage transform coefficient matrices and using a second transform technique, and encode the group of blocks into an encoding format using the DC second stage coefficient matrix and the first stage coefficient matrices.

These and other exemplary approaches will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
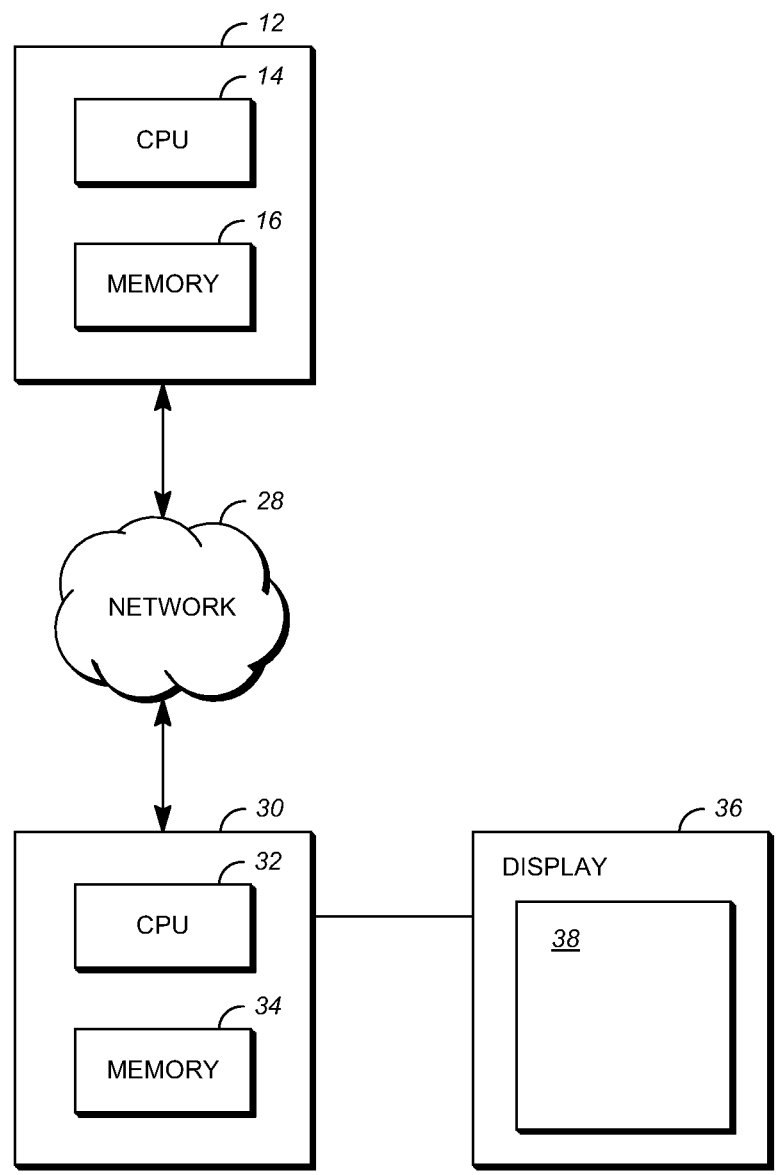
FIG. 1 is a schematic of a video encoding and decoding system.

FIG. 1 is a diagram of an encoder and decoder system 10 for still or dynamic video images. An exemplary transmitting station 12 may be, for example, a computer having an internal configuration of hardware including a processor such as a central processing unit (CPU) 14 and a memory 16. CPU 14 can be a controller for controlling the operations of transmitting station 12. The CPU 14 is connected to memory 16 by, for example, a memory bus. Memory 16 may be random access memory (RAM) or any other suitable memory device. Memory 16 can store data and program instructions which are used by the CPU 14. Other suitable implementations of transmitting station 12 are possible.

A network 28 connects transmitting station 12 and a receiving station 30 for encoding and decoding of the video stream. Specifically, the video stream can be encoded by an encoder in transmitting station 12 and the encoded video stream can be decoded by a decoder in receiving station 30. Network 28 may, for example, be the Internet. Network 28 may also be a local area network (LAN), wide area network (WAN), virtual private network (VPN), or any other means of transferring the video stream from transmitting station 12.

Receiving station 30, in one example, may be a computer having an internal configuration of hardware include a processor such as a central processing unit (CPU) 32 and a memory 34. CPU 32 is a controller for controlling the operations of transmitting station 12. CPU 32 can be connected to memory 34 by, for example, a memory bus. Memory 34 may be RAM or any other suitable memory device. Memory 34 stores data and program instructions which are used by CPU 32. Other suitable implementations of receiving station 30 are possible.

A display 36 configured to display a video stream can be connected to receiving station 30. Display 36 may be implemented in various ways, including by a liquid crystal display (LCD) or a cathode-ray tube (CRT). The display 36 can be configured to display a video stream decoded by the decoder in receiving station 30.

Other implementations of the encoder and decoder system 10 are possible. For example, one implementation can omit the network 28 and/or the display 36. In another implementation, a video stream may be encoded and then stored for transmission at a later time by receiving station 12 or any other device having memory. In another implementation, additional components may be added to the encoder and decoder system 10. For example, a display or a video camera may be attached to transmitting station 12 to capture the video stream to be encoded.

Figure 2:
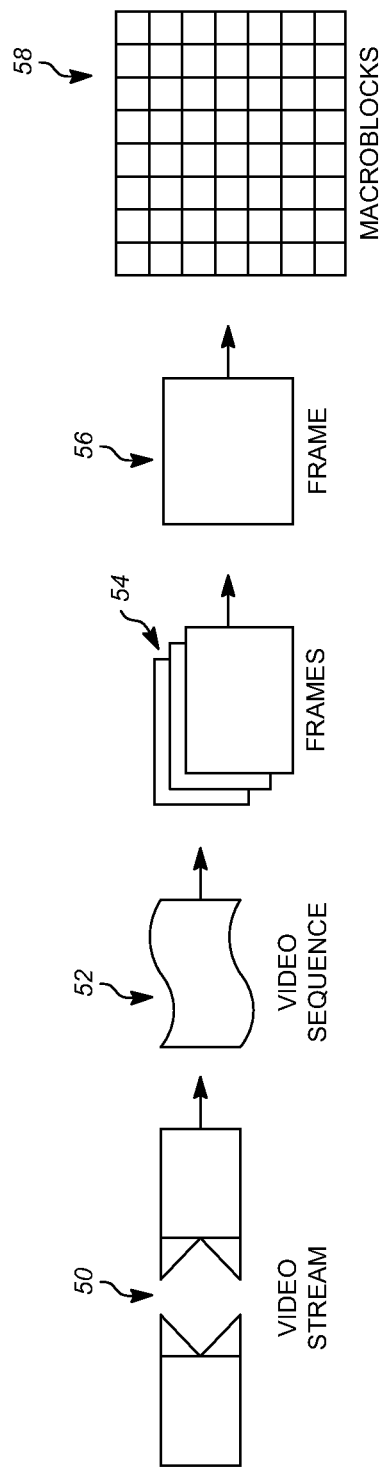
FIG. 2 is a diagram of a video bitstream.

FIG. 2 is a diagram a typical video stream 50 to be encoded and decoded. Video coding formats, such as VP8 or H.264, provide a defined hierarchy of layers for video stream 50. Video stream 50 includes a video sequence 52. At the next level, video sequence 52 consists of a number of adjacent frames 54, which can then be further subdivided into a single frame 56. At the next level, frame 56 can be divided into a series of blocks or macroblocks 58, which can contain data corresponding to, for example, a 16×16 block of displayed pixels in frame 56. Each block can contain luminance and chrominance data for the corresponding pixels. Blocks 58 can also be of any other suitable size such as 16×8 pixel groups or 8×16 pixel groups. Herein, unless otherwise stated, the terms macroblocks and blocks are used interchangeably.

Figure 3:
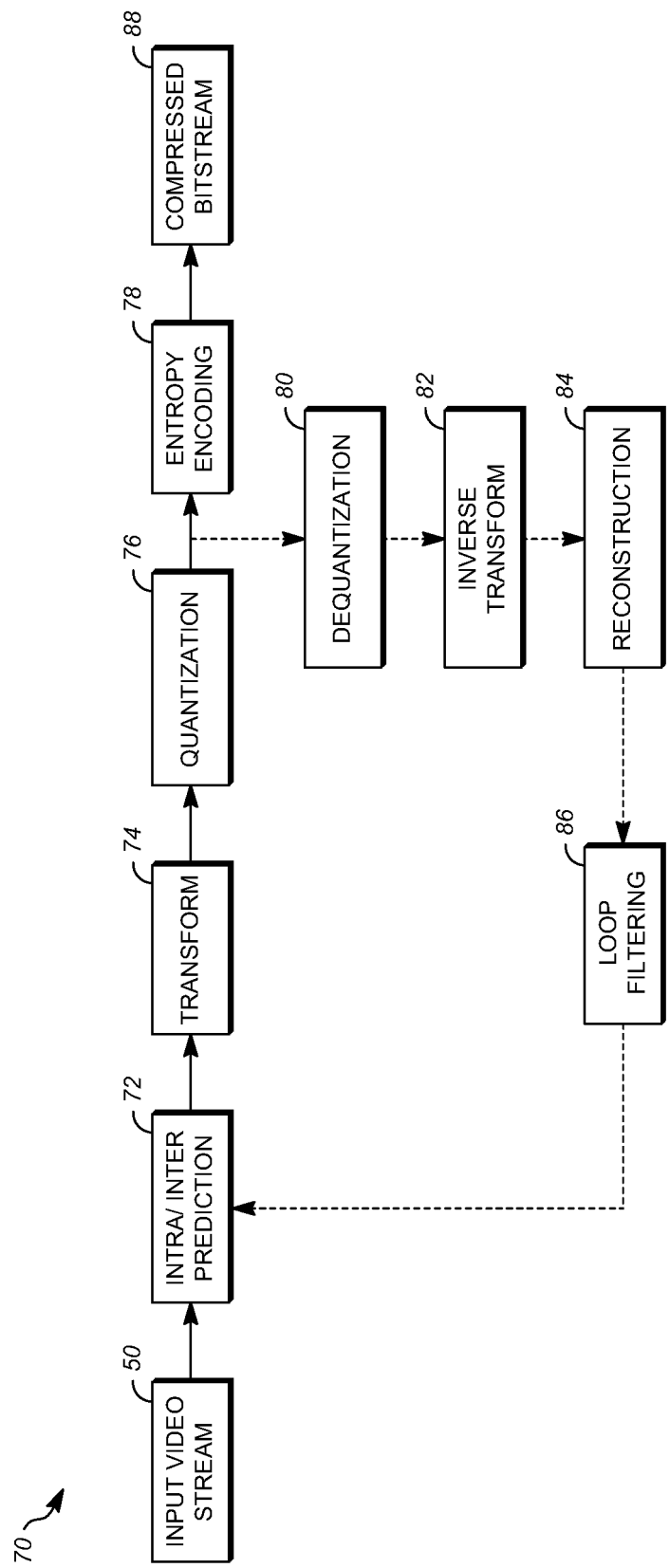
FIG. 3 is a block diagram of an encoder within the video encoding and decoding system of FIG. 1.

FIG. 3 is a block diagram of an encoder 70 within the video encoding and decoding system 10 of FIG. 1. An encoder 70 encodes an input video stream 50. Encoder 70 has the following stages to perform the various functions in a forward path (shown by the solid connection lines) to produce an encoded or a compressed bitstream 88: an intra/inter prediction stage 72, a transform stage 74, a quantization stage 76 and an entropy encoding stage 78. Encoder 70 also includes a reconstruction path (shown by the dotted connection lines) to reconstruct a frame for encoding of further macroblocks. Encoder 70 has the following stages to perform the various functions in the reconstruction path: a dequantization stage 80, an inverse transform stage 82, a reconstruction stage 84 and a loop filtering stage 86. Other structural variations of encoder 70 can be used to encode input video stream 50.

When input video stream 50 is presented for encoding, each frame 56 within input video stream 50 is processed in units of macroblocks. At intra/inter prediction stage 72, each macroblock can be encoded using either intra-frame prediction (i.e., within a single frame) or inter-frame prediction (i.e. from frame to frame). In either case, a prediction macroblock can be formed. In the case of intra-prediction, a prediction macroblock can be formed from samples in the current frame that have been previously encoded and reconstructed. In the case of inter-prediction, a prediction macroblock can be formed from samples in one or more previously constructed reference frames as described in additional detail herein.

Next, still referring to FIG. 3, the prediction macroblock can be subtracted from the current macroblock at stage 72 to produce a residual macroblock (residual). Transform stage 74 transforms the residual into transform coefficients in, for example, the frequency domain. Examples of block-based transforms include the Karhunen-Loève Transform (KLT), the Discrete Cosine Transform ("DCT") and the Singular Value Decomposition Transform ("SVD"). In one example, the DCT transforms the macroblock into the frequency domain. In the case of DCT, the transform coefficient values are based on spatial frequency, with the lowest frequency (i.e. DC) coefficient at the top-left of the matrix and the highest frequency coefficient at the bottom-right of the matrix.

Quantization stage 76 converts the transform coefficients into discrete quantum values, which are referred to as quantized transform coefficients or quantization levels. The quantized transform coefficients are then entropy encoded by entropy encoding stage 78. The entropy-encoded coefficients, together with the information required to decode the macroblock, such as the type of prediction used, motion vectors, and quantizer value, are then output to compressed bitstream 88. The compressed bitstream 88 can be formatted using various techniques, such as run-length encoding (RLE) and zero-run coding.

The reconstruction path in FIG. 3 is present to ensure that both encoder 70 and a decoder 100 (described below) use the same reference frames to decode compressed bitstream 88. The reconstruction path performs functions that are similar to functions that take place during the decoding process that are discussed in more detail below, including dequantizing the quantized transform coefficients at dequantization stage 80 and inverse transforming the dequantized transform coefficients at an inverse transform stage 82 in order to produce a derivative residual macroblock (derivative residual). At reconstruction stage 84, the prediction macroblock that was predicted at intra/inter prediction stage 72 can be added to the derivative residual to create a reconstructed macroblock. A loop filter 86 can then be applied to the reconstructed macroblock to reduce distortion such as blocking artifacts.

Other variations of encoder 70 can be used to encode compressed bitstream 88. For example, a non-transform based encoder can quantize the residual signal directly without transform stage 74. In another embodiment, an encoder may have quantization stage 76 and dequantization stage 80 combined into a single stage.

Figure 4:
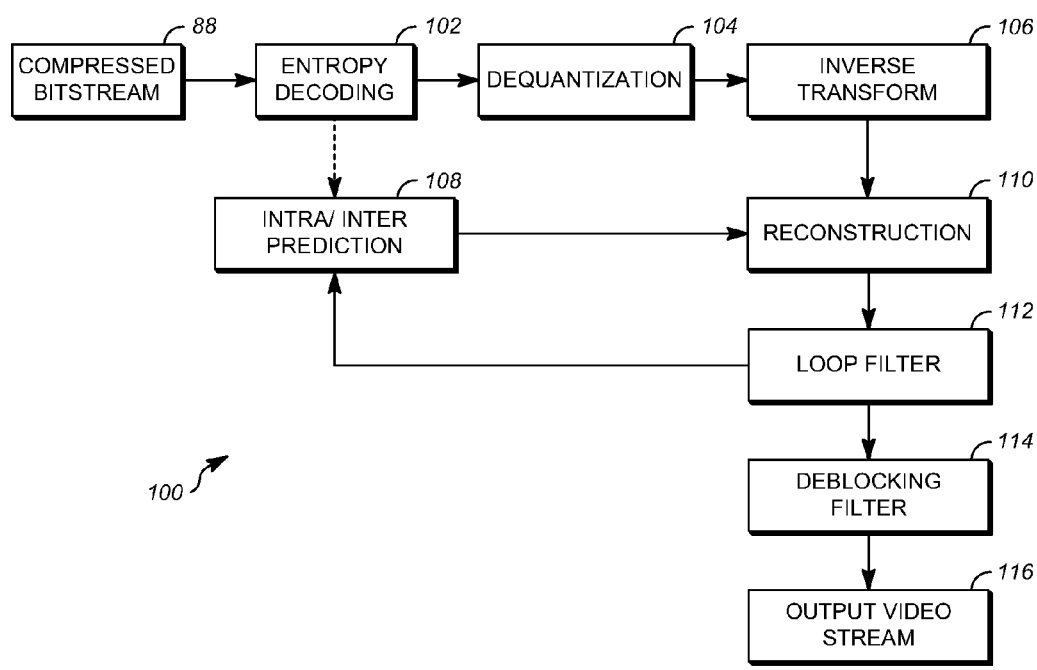
FIG. 4 is a block diagram of a decoder within the video encoding and decoding system of FIG. 1.

FIG. 4 is a block diagram of a decoder 100 within the video encoding and decoding system 10 of FIG. 1. Decoder 100, similar to the reconstruction path of the encoder 70 discussed previously, includes the following stages to perform various functions to produce an output video stream 116 from compressed bitstream 88: an entropy decoding stage 102, a dequantization stage 104, an inverse transform stage 106, an intra/inter prediction stage 108, a reconstruction stage 110, a loop filter stage 112 and a deblocking filtering stage 114. Other structural variations of decoder 100 can be used to decode compressed bitstream 88.

When compressed bitstream 88 is presented for decoding, the data elements within compressed bitstream 88 can be decoded by entropy decoding stage 102 (using, for example, Context Adaptive Binary Arithmetic Decoding) to produce a set of quantized transform coefficients. Dequantization stage 104 dequantizes the quantized transform coefficients, and inverse transform stage 106 inverse transforms the dequantized transform coefficients to produce a derivative residual that can be identical to that created by the reconstruction stage in the encoder 70. Using header information decoded from the compressed bitstream 88, decoder 100 can use intra/inter prediction stage 108 to create the same prediction macroblock as was created in encoder 70. At the reconstruction stage 110, the prediction macroblock can be added to the derivative residual to create a reconstructed macroblock. The loop filter 112 can be applied to the reconstructed macroblock to reduce blocking artifacts. Deblocking filter 114 can be applied to the reconstructed macroblock to reduce blocking distortion, and the result is output as output video stream 116.

Other variations of decoder 100 can be used to decode compressed bitstream 88. For example, a decoder may produce output video stream 116 without deblocking filtering stage 114.

As discussed previously, transform stage 74 of the encoder 70 transform codes the residual signal to coefficients and quantization stage 76 quantizes the coefficients to provide a set of quantized transformed coefficients. In one embodiment, for example, based on the 8-bit per sample YUV 4:2:0 image format, the residue signal can include of 24 (sixteen Y, four U, and four V) 4×4 quantized Discrete Cosine Transforms (DCT) transforms approximating the difference between an original macroblock in the uncompressed source and a prediction buffer. Of course, as indicated above, other image formats are also suitable and available.

Figure 5:
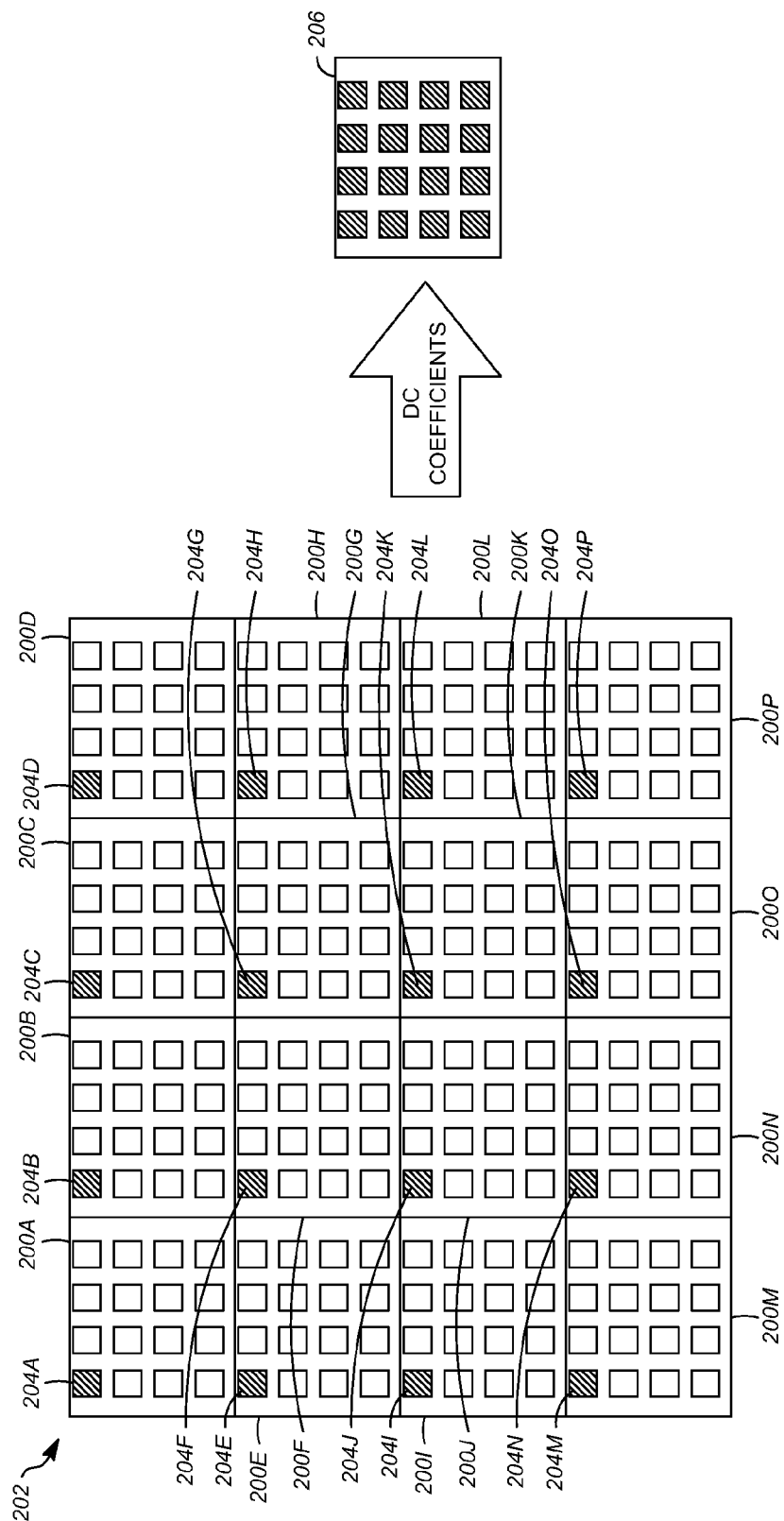
FIG. 5 is a schematic diagram of blocks subject to first and second order transformations in the encoder and decoder of FIGS. 3 and 4.

FIG. 5 is a schematic diagram of blocks subject to first and second order transformations in the encoder and decoder of FIGS. 3 and 4. The transforms for sixteen subblocks 200a-p are illustrated for a luma block 202. In this embodiment, each subblock 200a-p includes sixteen DCT coefficients. In other embodiments, other types of transforms other than DCT are also available. Further, in other embodiments, more or less DCT coefficients can be calculated for each subblock. In some current decoders, the DC coefficients 204a-p (i.e. average intensities) of the sixteen Y subblocks 200a-p, respectively, can be expressed via a $25^{th}$ virtual subblock 206. This $25^{th}$ subblock can be DCT transformed (i.e. second order DCT transformation).

In one embodiment, rather than subjecting the $25^{th}$ subblock to a second order DCT transformation, the $25^{th}$ subblock can undergo a Walsh-Hadamard transformation (WHT) in encoder 70 (e.g. at transform stage 74). This "higher-level" WHT can be a substitute for the explicit specification of the coefficients 204a-p similar to the way the DCT of subblocks 200a-p substitutes coefficients for the specification of the pixel values in the subblock. Rather than using an identical transformation (i.e. DCT) for both the first and second order transformations, utilizing WHT for the second order transformation can provide higher video quality. Because of the type of data within the $25^{th}$ subblock, WHT can provide a more suitable transformation than DCT as the second transform. For example, unlike the first order DCT, during the second order transformation, WHT may be more likely to retain high frequency data than DCT. Retention of high frequency data may be desirable when dealing with a subblock that only includes DC coefficients. Further, WHT is less computationally complex than DCT because WHT is based on, for example, addition and subtraction calculations rather than cosine calculations. Performing a transformation without cosine calculations permits greater accuracy and elimination of approximations that may be necessary when performing a DCT computation.

Because WHT may have a reduced compression efficiency as compared to DCT, until now, it may have not been considered to be an effective second order transformation for video compression. However, for example, the above mentioned benefits of using the WHT can outweigh the cost of reduced compression efficiency. Further, since the WHT second order transformation is applied to the $25^{th}$ (and not the 24 subblocks of the macroblock), the reduced compression efficiency (if any) can be considered minimal.

WHT can be applied to macroblocks predicted using any and all prediction modes or can be unavailable to specific prediction modes. For example, in one embodiment, WHT is not performed on the $25^{th}$ subblock for macroblocks encoded using split mode (where multiple motion vectors are applied to the Y subblocks) and/or a prediction mode where each subblock is independently predicted.

In the decoder 100 (e.g. inverse transform stage 106), for each macroblock, the dequantized $25^{th}$ subblock can be subjected to an inverse WHT and the remaining the 24 subblocks can be subjected to an inverse DCT. Reconstruction of the macroblocks can proceed as described above.

The operation of encoding and decoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

The embodiments of transmitting station 12 and/or receiving station 30 (and the algorithms, methods, instructions etc. stored thereon and/or executed thereby) can be realized in a computing device including hardware, software, or any combination thereof including, for example, IP cores, ASICS, programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of transmitting station 12 and receiving station 30 do not necessarily have to be implemented in the same manner.

Further, in one embodiment, for example, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a screencasting system. Alternatively, transmitting station 12 can be implemented on a server and receiving station 30 can be implemented on a device separate from the server, such as a hand-held communications device (i.e. a cell phone). In this instance, transmitting station 12 can encode content using an encoder into an encoded video signal and transmit the encoded video signal to the communications device. In turn, the communications device can then decode the encoded video signal using a decoder. Alternatively, the communications device can decode content stored locally on the communications device (i.e. no transmission is necessary). Other suitable transmitting station 12 and receiving station 30 implementation schemes are available. For example, receiving station 30 can be a personal computer rather than a portable communications device.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method comprising:
identifying a current block of a current frame of an input video stream;
generating an encoded block from the current block by encoding, by a processor in response to instructions stored on a non-transitory computer readable medium, the current block, wherein encoding the current block includes:
generating a first order transform block including a plurality of transform coefficients based on at least a portion of the current block using a first transform technique,
identifying a plurality of average intensity coefficients from the plurality of transform coefficients, wherein each average intensity coefficient from the plurality of average intensity coefficients represents an average intensity of a respective subblock of the first order transform block,
determining whether to encode the current block using a second transform technique, and
generating a second order transform block based on the plurality of average intensity coefficients using the second transform technique;
including the encoded block in an output bitstream; and
storing or transmitting the output bitstream.

2. The method of claim 1, wherein the first transform technique is a discrete cosine transform technique.

3. The method of claim 1, wherein the second transform technique is a Walsh-Hadamard transform technique.

4. The method of claim 1, wherein encoding the current block includes using the second transform technique on a condition that encoding the current block includes using a prediction mode other than a split mode.

5. The method of claim 1, wherein encoding the current block includes using the second transform technique on a condition that encoding the current block includes using a prediction mode other than a mode wherein each subblock is independently predicted.

6. The method of claim 1, wherein generating the first order transform block includes generating a plurality of subblocks.

7. The method of claim 6, wherein each subblock from the plurality of subblocks includes a respective average intensity coefficient.

8. The method of claim 7, wherein identifying the plurality of average intensity coefficients includes generating another subblock that includes the plurality of average intensity coefficients.

9. A method comprising:
identifying a current block of a current frame of an input video stream;
generating an encoded block from the current block by encoding, by a processor in response to instructions stored on a non-transitory computer readable medium, the current block, wherein encoding the current block includes:
generating a first order transform block including a plurality of transform coefficients based on at least a portion of the current block using a first transform technique, wherein generating the first order transform block includes generating a plurality of subblocks, wherein each subblock from the plurality of subblocks includes a respective average intensity coefficient that represents an average intensity of the respective subblock,
generating a constructed subblock that includes the respective average intensity coefficient from each subblock from the plurality of subblocks,
determining whether to encode the current block using a second transform technique, and
generating a second order transform block based on the constructed subblock using the second transform technique;
including the encoded block in an output bitstream; and
storing or transmitting the output bitstream.

10. The method of claim 9, wherein the first transform technique is a discrete cosine transform technique.

11. The method of claim 9, wherein the second transform technique is a Walsh-Hadamard transform technique.

12. The method of claim 9, wherein encoding the current block includes using the second transform technique on a condition that encoding the current block includes using a prediction mode other than a split mode.

13. The method of claim 9, wherein encoding the current block includes using the second transform technique on a condition that encoding the current block includes using a prediction mode other than a mode wherein each subblock is independently predicted.

14. A method comprising:
identifying a current block of a current frame of an input video stream;
generating an encoded block from the current block by encoding, by a processor in response to instructions stored on a non-transitory computer readable medium, the current block, wherein encoding the current block includes:
generating a first order transform block including a plurality of transform coefficients based on at least a portion of the current block using a first transform technique, wherein generating the first order transform block includes generating a plurality of subblocks, wherein each subblock from the plurality of subblocks includes a respective average intensity coefficient that represents an average intensity of the respective subblock,
generating a constructed subblock that includes the respective average intensity coefficient from each subblock from the plurality of subblocks,
determining whether to encode the current block using a second transform technique, and
generating a second order transform block based on the constructed subblock using the second transform technique;
including the encoded block in an output bitstream; and
storing or transmitting the output bitstream.

15. The method of claim 9, wherein the first transform technique is a discrete cosine transform technique.

16. The method of claim 9, wherein the second transform technique is a Walsh-Hadamard transform technique.

17. The method of claim 9, wherein encoding the current block includes using the second transform technique on a condition that encoding the current block includes using a prediction mode other than a split mode.

18. The method of claim 9, wherein encoding the current block includes using the second transform technique on a condition that encoding the current block includes using a prediction mode other than a mode wherein each subblock is independently predicted.

* * * * *